United States Patent [19]

Kondo

[11] Patent Number: 4,827,111
[45] Date of Patent: May 2, 1989

[54] INTELLIGENT-TYPE IC CARD CONTAINING IC CIRCUIT AND BATTERY

[75] Inventor: Akio Kondo, Tokyo, Japan

[73] Assignee: Casio Computer Co., Ltd., Tokyo, Japan

[21] Appl. No.: 32,724

[22] Filed: Mar. 30, 1987

[30] Foreign Application Priority Data

Apr. 8, 1986 [JP] Japan ................................. 61-80832

[51] Int. Cl.[4] ............................................... G06K 5/00
[52] U.S. Cl. ..................................... 235/380; 235/492
[58] Field of Search ......................... 235/380, 487, 492

[56] References Cited

U.S. PATENT DOCUMENTS

| | | | |
|---|---|---|---|
| 3,3,906,460 | 9/1975 | Halpern | 340/172.5 |
| 4,004,133 | 1/1977 | Hannan et al. | 235/487 X |
| 4,105,156 | 8/1978 | Dethloff | 235/441 |
| 4,480,178 | 10/1984 | Miller et al. | 235/380 |
| 4,614,861 | 9/1986 | Pavlov et al. | |
| 4,634,845 | 1/1987 | Hale et al. | 235/380 |
| 4,692,601 | 9/1987 | Nakano | 235/380 |

FOREIGN PATENT DOCUMENTS

3516613A1 11/1986 Fed. Rep. of Germany.
0150088 7/1986 Japan ................................. 235/487

Primary Examiner—Peter S. Wong
Assistant Examiner—Marc S. Hoff
Attorney, Agent, or Firm—Frishauf, Holtz, Goodman & Woodward

[57] ABSTRACT

An IC card and an IC card system using this card can be independently operated by a battery built in the IC card. The IC card and its system can detect power supplied from the card terminal and use a clock signal as an operating signal from the card terminal upon detection. Otherwise, a clock signal having a low frequency generated in a clock signal generating section in the card is used as an operating signal, thereby extremely reducing power consumption of the battery built into the card.

11 Claims, 6 Drawing Sheets

F I G. 1A
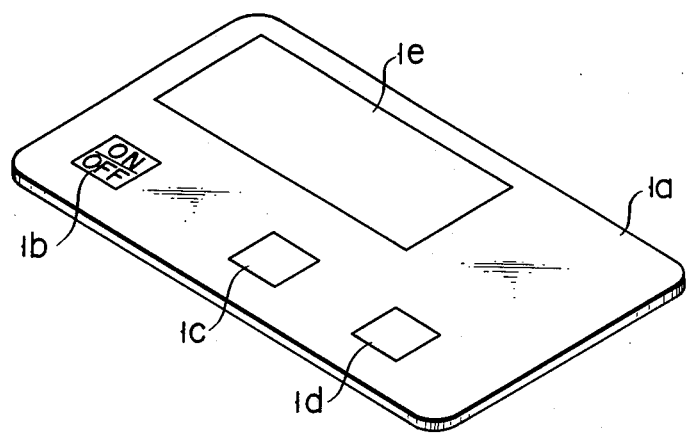
F I G. 1B
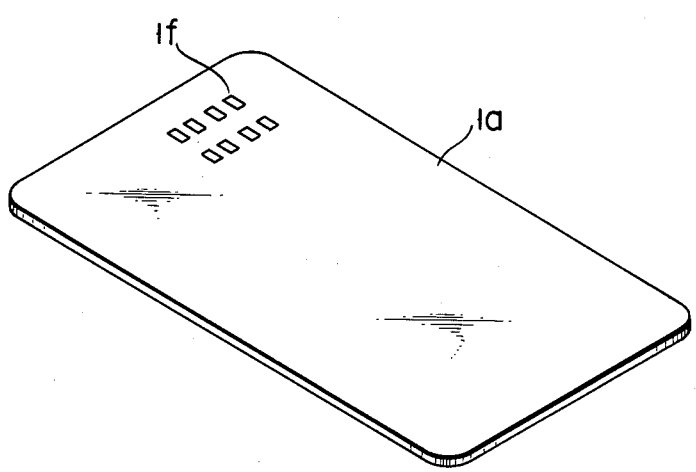

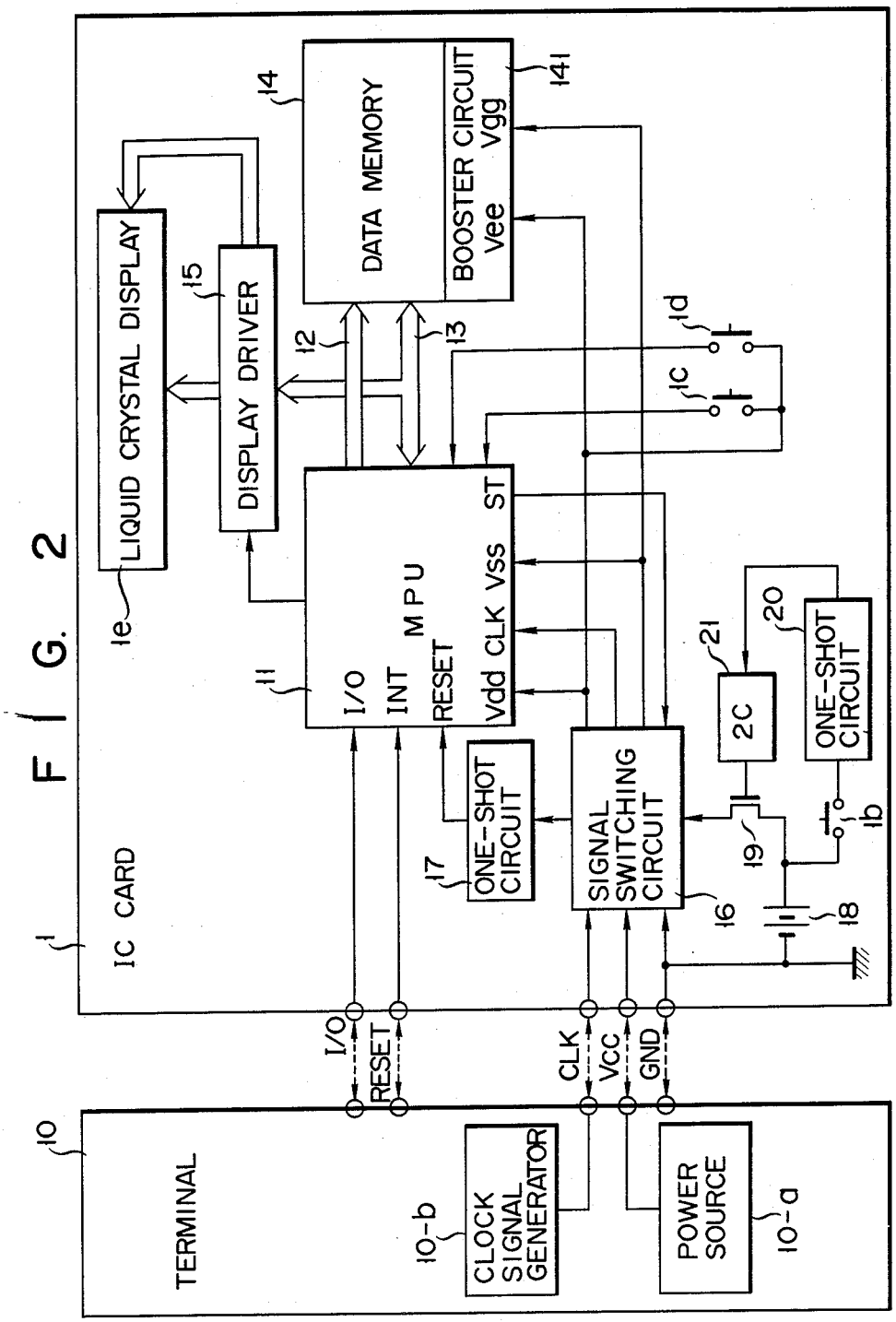

F I G. 3
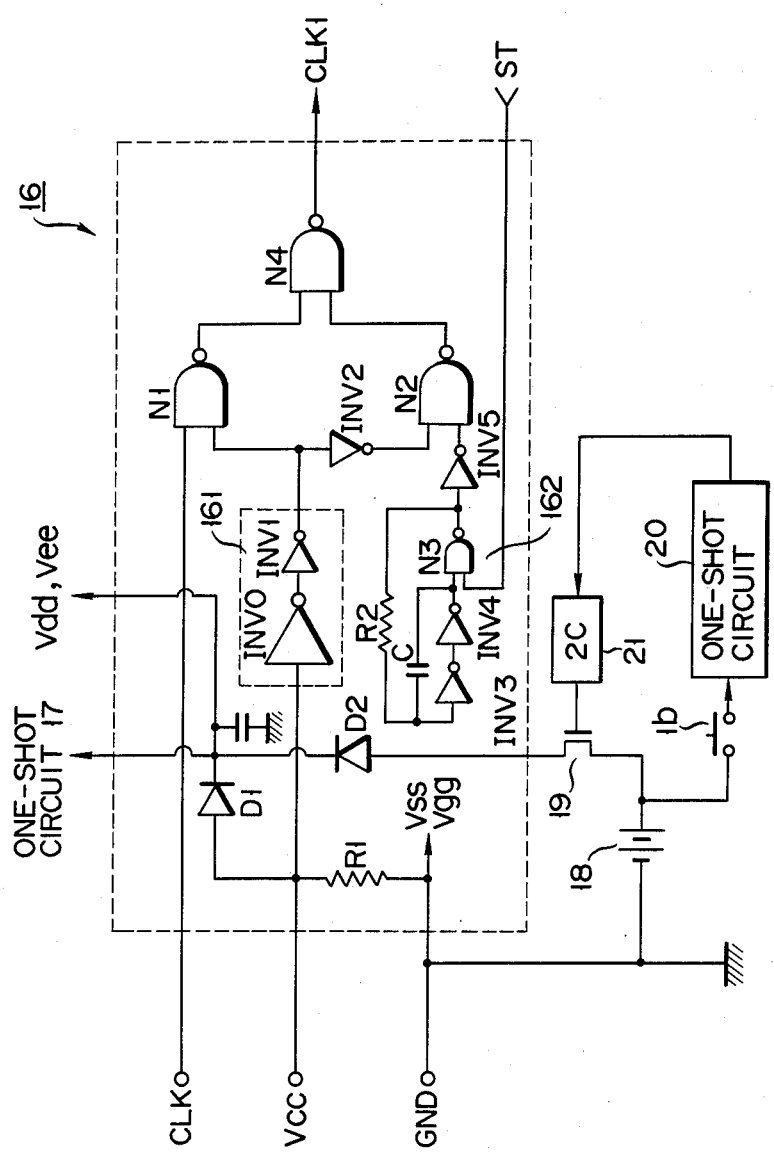

INTELLIGENT-TYPE IC CARD CONTAINING IC CIRCUIT AND BATTERY

BACKGROUND OF THE INVENTION

The present invention relates to a so-called intelligent-type IC card containing at least an IC circuit and a battery to allow selection of an application, and also to an IC card system using the intelligent type IC card.

These days are called a "cashless era," and users can purchase desired items by using a card issued by a credit company without using cash.

The existing cards are a plastic card, an embossed card, a magnetic-stripe card, and the like. These cards can be easily counterfeited and often illegally used.

An information card called an IC card is proposed wherein an IC circuit for storing a password is incorporated in the card, and the password is not easily read out. An IC card system as a combination of such an IC card and a terminal has been developed.

Such a conventional IC card system does not have a power source. The card cannot be operated by itself. For this reason, all applications to be designated in the IC card are stored in a terminal. However, in practice, when such applications are stored in the terminal, the information stored in the terminal greatly increases. This makes the IC card system impractical. In a conventional IC card system, versatility of the IC card and the terminal is lost, thus resulting in inconvenience.

A so-called intelligent-type IC card has been proposed in recent years. A power source is built in the IC card to allow designation of an application therein, and designation information is sent from the IC card to a terminal.

Since an IC card has a thin shape, the power source comprises a small-capacity paper battery. Power consumption in the card determines the service life of the battery. In the worst case, practicality of the card itself may be lost.

SUMMARY OF THE INVENTION

The present invention has been made in consideration of the above situation and has as its object to provide a practical battery-operated intelligent type IC card and an IC card system using the same, wherein internal power consumption in the card is reduced to prolong the service life of the battery.

According to the present invention, there is provided an IC card having at least one IC circuit, comprising power source means for supplying power to said IC circuit, detecting means for detecting power supplied from outside said IC card so as to drive said IC card, clock signal generating means for generating a first clock signal to drive said IC circuit, and clock signal selecting means for selecting one of said first clock signal supplied from said clock signal generating means and a second clock signal supplied from outside said IC card, on the basis of a detection result of said detecting means, and for supplying a selected clock signal to said IC circuit.

BRIEF DESCRIPTION OF THE DRAWINGS

FIGS. 1A and 1B are perspective views showing an IC card according to a first embodiment of the present invention;

FIG. 2 is a block diagram showing a circuit arrangement according to the first embodiment;

FIG. 3 is a detailed circuit diagram of a signal switching circuit used in the first embodiment;

DETAILED DESCRIPTION OF THE PREFERRED EMBODIMENTS

Figure 4:
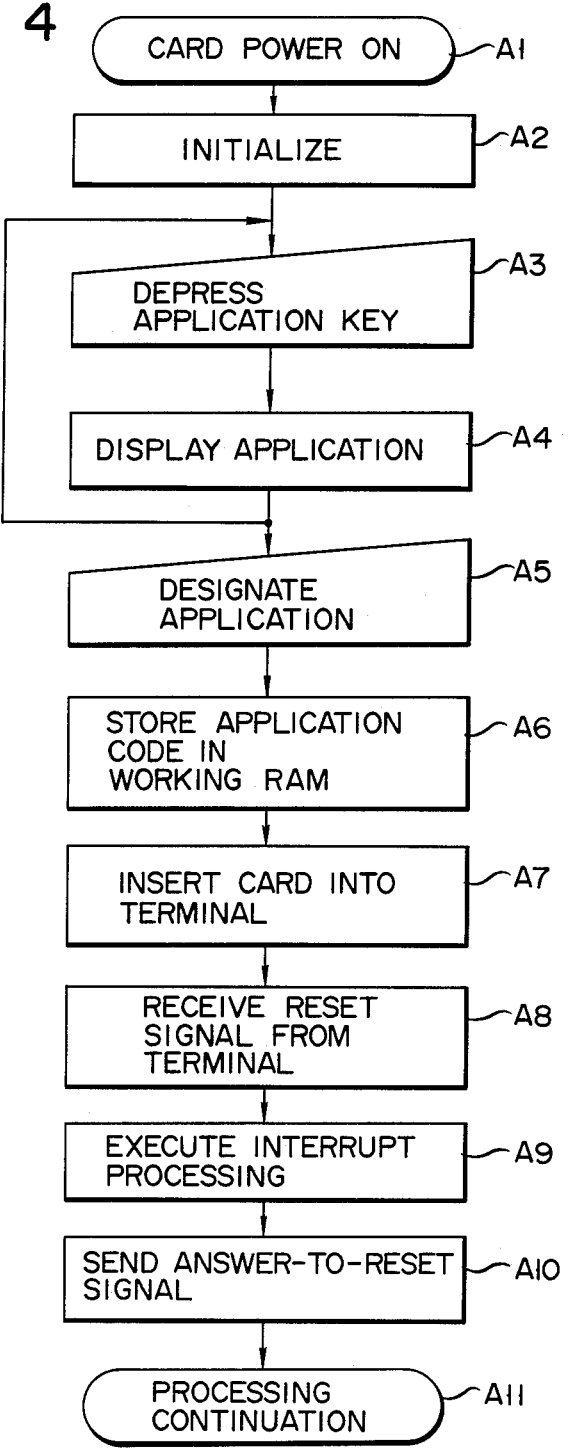
FIG. 4 is a flow chart for explaining the operation of the first embodiment.

An embodiment of the present invention will be described in detail with reference to the accompanying drawings.

FIGS. 1A and 1B show the outer appearance of an intelligent type IC card.

Referring to FIGS. 1A and 1B, reference numeral 1a denotes a card body. An IC circuit and a battery are built in body 1a. As shown in FIG. 1A, power on/off key 1b, application designation key 1c, and execution key 1d are arranged on the upper surface of card body 1a. Liquid crystal display (LCD) 1e is also arranged on the upper surface of body 1a. Key 1b is turned on upon the first depression, and is turned off upon the second depression. Key 1c causes the user to cyclically select one of applications such as shopping-at-home, banking-at-home and reservation-at-home upon every depression. The selected application is displayed on liquid crystal display 1e. Key 1d causes an execution of the displayed application. Card body 1a has external connecting contacts 1f on the lower surface thereof, as shown in FIG. 1B. The number of contacts 1f is 8 (=4 contacts×2 rows) for eight pins.

FIG. 2 shows the circuit arrangement of the IC card shown in FIGS. 1A and 1B. Referring to FIG. 2, reference numeral 1 denotes an IC card; and 10, a terminal for receiving card 1 therein. Card 1 includes MPU (microprocessor) 11. MPU 11 comprises a controller section, a memory section, and an arithmetic unit section.

Data memory 14 is connected to MPU 11 having the above arrangement through address line 12 and data line 13. Data memory 14 comprises, e.g., an EEP-ROM (Electrically Erasable Programmable Read-Only Memory). Various codes such as a card identification code, information such as status data, and application codes corresponding to applications are stored in data memory 14. Application codes are codes respectively corresponding to shopping-at-home, banking-at-home, and reservation-at-home.

Data memory 14 includes booster circuit 141. Booster circuit 141 is used in data write mode of data memory 14.

Display driver 15 is connected to data line 13. Driver 15 receives a control signal from MPU 11. Liquid crystal display 1e described with reference to FIG. 1A is connected to driver 15. Liquid crystal display 1e receives an LCD common signal and a display data signal from driver 15.

External connecting contacts 1f to be connected to terminal 10 include the I/O terminal, the Reset terminal, the CLK terminal, the Vcc terminal, and GND terminal. The I/O terminal of the IC card is connected to the I/O terminal of MPU 11. The Reset terminal is connected to the INT terminal, i.e., the interrupt terminal of MPU 11. The CLK, Vcc and GND terminals of card 1 are connected to signal switching circuit 16.

Terminal 10 is used to exchange data with IC card 1, and is described in detail in U.S. patent application Nos.

884,279 and 884,280 filed by the present applicant on July 10, 1986. Terminal 10 includes power source 10-a and clock signal generator 10-b.

IC card 1 and terminal 10 execute a designated application after preprocessing such as answer-to-reset operation and attribute control is performed according to a predetermined protocol (described later).

The detailed arrangement of signal switching circuit 16 is shown in FIG. 3. When power voltage Vcc (+5V) is supplied from power source 10-a of terminal 10 to signal switching circuit 16, a voltage across resistor R1 between the Vcc and GND terminals appears as voltages Vdd and Vee through diode D1. Voltages Vdd and Vee are supplied to the Vdd terminal of MPU 11 and the Vee terminal of booster circuit 141 in FIG. 1. Power voltage Vcc at the Vcc terminal is also applied to one-shot circuit 17 via diode D1 in FIG. 2. In this case, one-shot circuit 17 generates a one-shot signal which is then supplied to the Reset terminal of MPU 11, thereby initializing MPU 11.

Voltages at the GND terminal side of resistor R1 are supplied as Vss and Vgg to the Vss terminal of MPU 11 and the Vgg terminal of the booster circuit, respectively.

Drive voltage Vcc at the Vcc terminal is supplied to voltage detector 161. Detector 161 comprises two inverters INV0 and INV1. Inverter INV0 comprises CMOS transistors. When power voltage Vcc exceeding a predetermined threshold level is applied to the gate side of inverter INV0, it generates a signal of logic "0". Otherwise, inverter INV0 generates a signal of logic "1". An output from inverter INV0 is inverted by inverter INV1.

A detection signal from voltage detector 161 is supplied to one input terminal of NAND gate N1 and to one input terminal of NAND gate N2 through inverter INV2.

An external clock signal is supplied via the CLK terminal from clock signal generator 10-b to the other input terminal of NAND gate N1. In this case, the clock signal has a frequency of 4.9152 MHz defined by ISO standards. A clock signal from a self-excited oscillator (e.g., CR oscillator 162) as a clock generating means is supplied to the other input terminal of NAND gate N2. Oscillator 162 comprises capacitor C, resistor R2, inverters INV3, IV4, and INV5, and NAND gate N3 and generates a clock signal having a predetermined frequency by self oscillation. In this case, the oscillation frequency is sufficiently lower than that of the external clock signal and falls within the range of, e.g., 30 to 100 kHz. Oscillator 162 starts in response to an ST signal output from the ST terminal of MPU 11.

Outputs from NAND gates N1 and N2 are supplied to NAND gate N4, and gate N4 generates clock signal CLK1. Signal CLK1 is supplied to the CLK terminal of MPU 11.

A series circuit of internal battery 18 and switching element 19 is connected between the GND terminal and signal switching circuit 16. Battery 18 comprises a paper-like thin battery having a lower voltage (about 1.5V or 3V) lower than power voltage Vcc. Switching element 19 comprises an n-channel MOS transistor which alternately receives signal of logic "0" and "1" through one-shot circuit 20 and binary counter 21 upon the depression of power on/off key 1b described with reference to FIG. 1A. Switching element 19 is turned on when the count of counter 21 is "1". An output from battery 18 which is supplied to signal switching circuit 96 through switching element 19 upon the depression of key 1b serves as voltages Vdd and Vee which are respectively supplied to the Vdd terminal of MPU 11 and the Vee terminal of booster circuit 141 through diode D2. The output from battery 18 is also supplied to one-shot circuit 17 to initialize MPU 11.

Referring back to FIG. 2, the Vdd and Vcc output lines are connected to one terminal of application designation key 1c and one terminal of execution key 1d shown in FIG. 1A. Both the other terminal of keys 1c and 1d are connected to MPU 11.

The operation of the embodiment described above will be described below.

As shown in the flow chart of FIG. 4, power of IC card 1 is turned on in step A1. In this case, the user depresses power on/off key 1b shown in FIG. 1A. Upon depression of key 1b, an output is generated by one-shot circuit 20 in FIG. 2 and is supplied to binary counter 21. The content of counter 21 is changed in an order of "0", "1", "0" for every input. If the count of counter 21 is set to be "0", the count is updated to "1" in response to the output from one-shot circuit 20. Therefore, switching element 19 is turned on, and power is supplied from battery 18 to signal switching circuit 16. As shown in FIG. 3, voltages Vdd and Vee are respectively applied to the Vdd terminal of MPU 11 and the Vee terminal of booster circuit 141 through diode D2.

The flow advances to step A2. Since the IC card is energized by battery 18 in step A1, one-shot circuit 17 is also powered in step A2. An output from one-shot circuit 17 is generated and supplied to the Reset terminal of MPU 11, thereby initializing MPU 11.

Figure 5:
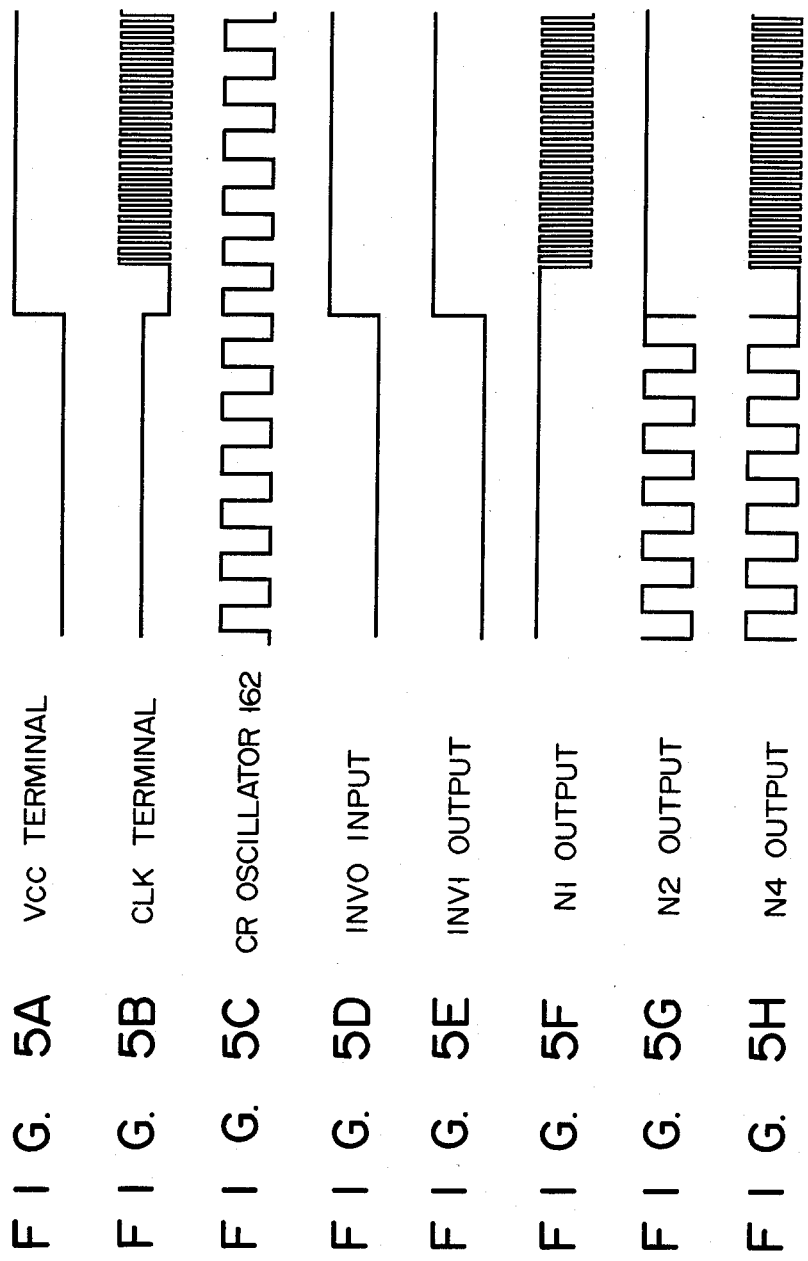
FIGS. 5A to 5H are timing charts for explaining the operation of the first embodiment.

Thereafter, the ST signal is generated from the ST terminal of MPU 11 and is supplied to CR oscillator 162. The operation of oscillator 162 is started. At this time, an output of oscillator 162 has the waveform shown in FIG. 5C. No inputs are supplied to the Vcc and CLK terminals in FIG. 3. Thus, an output of logic "1" is supplied from inverter INV2 to one input terminal of NAND gate N2. When an output from oscillator 162 is supplied to NAND gate N2, an output shown in FIG. 5G is generated by NAND gate N2. This output is supplied to NAND gate N4. At the same time, NAND gate N4 receives an output of logic "1" from NAND gate N1. Therefore, NAND gate N4 generates an output shown in FIG. 5H, and this output is supplied as clock signal CLK 1 to MPU 11.

The flow advances to steps A3 and A4. In steps A3 and A4, the user designates an application with application designation key 1c. More specifically, when the user depresses key 1c shown in FIG. 1A, a key input is supplied to MPU 11. First application data is read out from data memory 14 in response to a control instruction from MPU 11. This data is displayed on liquid crystal display 1e through display driver 15.

If the user judges that the display content on liquid crystal display 1e is not desirable, he or she depresses key 1c again. In the same manner as described above, another key input is supplied to MPU 11, and next application data is read out from data memory 14. This data is displayed on liquid crystal display 1e. In the same manner as described above, the operations in steps A3 and A4 are repeated.

In this case, if the user judges that the display content on liquid crystal display 1e is a desired one, she or he depresses execution key 1d. The flow then advances to steps A5 and A6. A key input from execution key 1d is supplied to MPU 11 shown in FIG. 2. At this time, application data displayed on display 1e is stored For example, the stored data is "00000010" for shopping-at-home code, "00000010" for banking-at-home code, or "00000011" for reservation-at-home code.

The application is thus designated by IC card 1.

The flow then advances to step A7. In step A7, the user inserts the card into terminal 10 while the power of card 1 is kept on upon completion of application designation. When card 1 is completely mounted in terminal 10, the I/O, Reset, CLK, Vcc, and GND terminals of card 1 are respectively connected to the I/O, Reset, CLK, Vcc, and GND terminals of terminal 10, as shown in FIG. 2.

When IC card 1 is mounted in terminal 10, an initialization signal is sent from terminal 10 to IC card 1. In response to the initialization signal, the I/O terminal is set at H level, the Reset terminal goes from L level to H level, clock signal CLK having a predetermined frequency such as 4.9152 MHz shown in FIG. 5B is supplied to the CLK terminal, and power voltage Vcc, e.g., 5V, as shown in FIG. 5A, is supplied to the Vcc terminal.

At the leading edge of the input (FIG. 5D), voltage detector 161 in signal switching circuit 16 generates an output of logic "1" shown in FIG. 5E. Upon reception of clock signal CLK from the CLK terminal, NAND gate N1 supplies an output (FIG. 5F) to NAND gate N4. In this case, since NAND gate N2 receives an output of logic "0" from inverter INV2, an output from NAND gate N2 is set at logic "1", regardless of the output from oscillator 162. An output shown in the right side in FIG. 5H is generated by NAND gate N4 and is supplied as clock signal CLK1 to MPU 11.

In this state, IC card 1 is restarted according to the operating conditions, in response to the initialization signal. In step A8, a signal input to the Reset terminal of IC card 1 is supplied to the INT terminal of MPU 11. In step A9, interrupt processing is executed. In this processing, all the contents of MPU 11 except for the application code designated by execution key 1d are cleared. In this state, voltage Vcc at the Vcc terminal is applied as voltages Vdd and Vee to MPU 11 and booster circuit 141 of data memory 14. In step A10, answer-to-reset data is read out from MPU 11 and is sent to terminal 10 through the I/O terminal.

In step A11, the application code is sent to terminal 10, and processing on the basis of this code is executed in terminal 10. In this case, the answer-to reset data is sent from IC card 1 to terminal 10, terminal 10 determines that this data is correct. In this state, terminal 10 extracts an ENQ (enquiring) code which is sent to card 1. MPU 11 determines whether the ENQ code can be received in the normal operating condition. If YES in this step, code ACK (acknowledge) is extracted. Otherwise, code NO is extracted. The extracted code is sent to terminal 10 through the I/O terminal. When terminal 10 determines that card 1 is normally operated, a TC code is sent to card 1. Card 1 extracts application data, and the application data is sent back to terminal 10 through the I/O terminal. Terminal 10 determines the application of the code and extracts an instruction code on the basis of this determination. The instruction code is sent back to card 1. In this manner, when the instruction code is extracted, an input password entered at terminal 10 is compared with personal identification code PIN prestored in card 1. If a coincidence is established, information exchange processing such as a transaction is performed. The above processing is described in detail in the U.S. patent application Nos. 884,279 and 884,280.

With the above arrangement, in the intelligent type IC card having a battery and designed to designate an application by itself, a detecting means is arranged to detect power voltage Vcc applied from terminal 10. When power voltage Vcc is detected by this means, the external clock signal is received as an operating signal. Otherwise, i.e., if power voltage Vcc applied from terminal 10 is not detected during the independent use of the card, the clock signal from the internal CR oscillator is received as an operating signal. In particular, since the frequency of the clock signal from the internal CR oscillator is lower than that of the external clock signal, power consumption in the card can be reduced. An influence on the service time of a small-capacitor battery such as a paper-like thin battery can be eliminated. If the frequency of the clock signal from the internal CR oscillator is the same as that (4.9152 MHz) of the external clock signal, a current of about 20 mA is supplied in the internal circuit of the card. If a 40-mA/H paper battery is used, the service life is only 2 hours. In addition, the oscillator must be synchronized with the external clock signal. For this reason, high precision is required, and a quartz oscillator or CERALOCK (a ceramic oscillator) must be used as an oscillation source, resulting in high cost and reducing the practicality of the card. However, with the arrangement of the embodiment described above, all the above problems can be solved.

Figure 6:
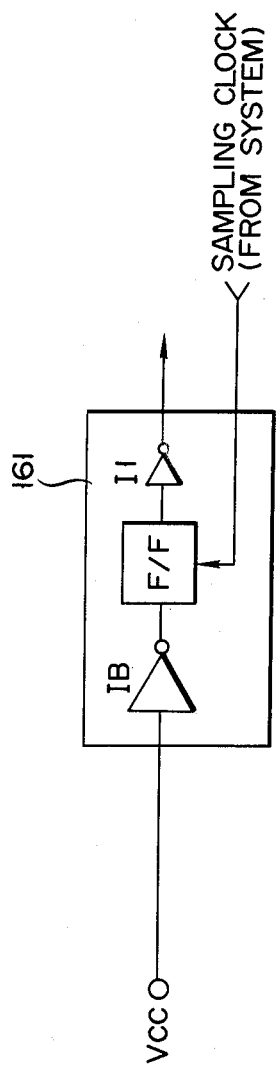
FIG. 6 is a circuit diagram showing the main part of a second embodiment of the present invention.

The present invention is not limited to the first embodiment described above. Various changes and modifications may be made within the spirit and scope of the invention. In the above embodiment, when power voltage Vcc at the Vcc terminal is detected, NAND gates N1 and N2 are switched over. However, as shown in FIG. 6, flip-flop FF can be provided within voltage detector 161 in the second embodiment, and can be driven in response to sampling clocks. In this case, even if noise is mixed from the Vcc terminal, the noise influence can be eliminated.

According to the present invention, in the intelligent type IC card which can be used singly, when the card is used independently, the frequency of the clock signal is changed by signal switching means to a lower frequency than that of the external clock signal, and the clock signal having a lower frequency is used as an operating signal, thus prolonging the service life of the battery.

What is claimed is:

1. An IC card having at least one IC circuit, comprising:
    power source means for supplying power to said IC circuit;
    detecting means for detecting power supplied from outside said IC card so as to drive said IC card;
    clock signal generating means for generating a first clock signal to drive said IC circuit; and
    clock signal selecting means for selecting one of said first clock signal supplied from said clock signal generating means and a second clock signal supplied from outside said IC card, on the basis of a detection result of said detecting means, and for supplying a selected clock signal to said IC circuit.

2. A card according to claim 1, wherein said clock signal selecting means includes means for selecting said second clock signal supplied from outside said IC card, and means for supplying said second clock signal to said IC circuit when said detecting means detects the power supplied from outside said IC card.

3. A card according to claim 2, wherein said detecting means includes first and second inverters, signal selecting means is controlled in response to an output from said second inverter.

4. A card according to claim 3, wherein the power supplied from outside said IC card has a higher voltage level than that of the power generated by said power source means, and further including means for interrupting the power from said power source means to said IC circuit when the power supplied from outside said IC card is supplied to said IC circuit.

5. A card according to claim 2, wherein the frequency of said first clock signal generated by said clock signal generating means is lower than that of said second clock signal supplied from outside said IC card.

6. A card according to claim 5, further including:
display means for displaying at least transaction data; and
key input means for inputting a command signal to control said IC circuit.

7. An IC card system comprising:
IC card having at least one IC circuit and including first power source means for supplying power to said IC circuit, and first clock signal generating means for generating a first clock signal to drive said IC circuit; and
terminal means, in which said IC card is insertable, for performing data communication with said IC card when it is inserted in said terminal means, said terminal means including second power source means for supplying power to said IC card, and second clock signal generating means for generating a second clock signal to supply said second clock signal to said IC card,
said IC card further including detecting means for detecting the power supplied from said terminal means, and means for selecting one of said first clock signal generated by said clock signal generating means and said second clock signal supplied from said second clock signal generating means in said terminal means, on the basis of a detection result of said detecting means.

8. A system according to claim 7, wherein said clock signal selecting means includes means for selecting of said second clock signal, and means for supplying said second clock signal to said IC circuit when said detecting means detects that said IC card is inserted into said terminal means and that the power is supplied from said terminal means to said IC card.

9. A system according to claim 8, wherein said detecting means includes a first inverter and a second inverter, wherein said clock signal selecting means is controlled by an output signal of said second inverter.

10. A system according to claim 8, wherein a frequency of said first clock signal generated by said first clock generating means is lower than that of said second clock signal generated by said second clock signal generating means.

11. A system according to claim 7, wherein a power level of said second power source means in said terminal means is higher than that of said first power source means in said IC card, and further including means for interrupting the power from said power source means to said IC circuit when the power is supplied from said second power source means to said IC card.

* * * * *